3,047,584
INDOLE-CARBOXYLIC ACID-DIALKYLAMINO ALKYL ESTERS

Samuel Elkin, 6308 Elmhurst St., Philadelphia 11, Pa., and Francis Marion Miller, 1109 Gary Drive, Baltimore 28, Md.
No Drawing. Filed Apr. 27, 1960, Ser. No. 24,869
13 Claims. (Cl. 260—319)

This invention relates to new series of organic compounds. More particularly, the present invention is concerned with certain indole-carboxylic acid-dialkylaminoalkyl esters, their salts and methods for their preparation.

The new indole compounds may be represented by the following general structural formula:

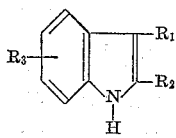

wherein either of the substituents $R_1$ or $R_2$ represents COOXN=B, the other being hydrogen, X being a lower alkylene group such as methylene, ethylene, propylene, butylene, pentylene, hexylene, etc., and N=B is N,N-di-lower alkylamino wherein the alkyl group is methyl, ethyl, propyl, isopropyl, butyl, isobutyl, pentyl, isopentyl, hexyl, etc. $R_3$ in the above general formula is hydrogen or a nitro group.

The compounds of this invention may be converted to their therapeutically active acid addition salts by reaction with an appropriate acid as for example an inorganic acid such as a hydrohalic acid, i.e., hydrobromic, hydriodic or, preferably, hydrochloric; sulfuric, nitric or thiocyanic acid; a phosphoric acid; an organic acid such as acetic, propionic, glycolic, lactic, pyruvic, oxalic, malonic, succinic, maleic, fumaric, malic, tartaric, citric, benzoic, cinnamic, mandelic, hydroxyethane sulfonic, benzenesulfonic, p-toluenesulfonic, salacylic, p-amino-salicylic, 2-phenoxy-benzoic or 2-acetoxy-benzoic acid.

Preparation of the novel dialkylaminoalkyl indole carboxylates is advantageously accomplished by reacting the indole carboxylic acid with the appropriate dialkylaminoalkyl halide, preferably the chloride. The reaction is carried out at room temperature or, preferably, at elevated temperature under reflux for a period of time varying from a few minutes to several hours. It is suitably conducted in the presence of an inert organic solvent such as an alkanol as for example, methanol, ethanol, propanol, or, preferably, isopropanol; a hydrocarbon such as benzene, toluene, xylene, or a high boiling petroleum ether, or in dioxane.

If desired, the reaction may be carried out in the presence of an alkali metal alkoxide such as sodium or potassium methoxide, ethoxide, propoxide or butoxide. Alternatively, the indole carboxylic acid starting material may first be treated with an equivalent amount of a strong base, e.g., sodium hydroxide or potassium hydroxide and the appropriate dialkylaminoalkyl halide added thereto.

Depending upon the conditions employed during the course of the reaction, the novel compounds are obtained either in the form of free bases or salts thereof. The salts are converted to the free bases in the usual manner, e.g., by reaction with alkali such as sodium or potassium hydroxide. The bases can be converted to their therapeutically useful acid addition salts by reaction with an appropriate organic or inorganic acid such as one of those named above.

The indole-3-carboxylic acid starting material may be prepared in any one of a variety of methods. A particularly suitable synthesis which gives satisfactory yields comprises hydrolysis of an alkyl ester of the acid. The latter, preferably the ethyl ester, is obtained by reacting an alkyl haloformate, i.e., ethyl chloroformate, with an indolyl magnesium halide, preferably the iodide. The resulting ester is then suitably hydrolyzed by addition of alkali metal hydroxide such as potassium hydroxide or sodium hydroxide to give the salt of the desired acid, which, upon acidifying, preferably with acetic acid, gives the desired acid. The nitrated form of this acid is conveniently obtained by suspending the acid in glacial acetic acid and adding an equivalent volume of concentrated nitric acid at room temperature.

Preparation of the indole-2-carboxylic acid starting material is accomplished by a modified Reissert [Berichte 30, 1030 (1897)] synthesis.

Diethyloxalate is condensed with o-nitrotoluene in the presence of sodium ethoxide to give ethyl o-nitrophenyl-pyruvate. The latter is completely hydrolyzed to the free acid by prolonged refluxing of the aqueous mixture. Ring closure of the o-nitrophenylpyruvic acid to give indole-2-carboxylic acid is effected by boiling with ferrous sulfate in ammonium hydroxide.

An alternate method for the preparation of the novel esters, and one which is also intended to be included within the scope of this invention comprises transesterification of the indole carboxylic acid ethyl esters with an appropriate dialkylaminoalcohol preferably in the presence of a nonpolar inert organic solvent such as benzene, xylene, toluene or dioxane. The reaction proceeds at variable rates depending upon the temperature conditions, which may be varied from 25° C. to 100° C., as desired. Still another method for preparing the novel esters is the direct esterification of the indole carboxylic acid with the appropriate amino lower alkyl alkanol in the presence of a mineral acid such as hydrochloric acid, sulfuric acid, phosphoric acid or in the presence of an organic acid such as a sulfonic acid, i.e., p-toluene sulfonic acid, or benzene sulfonic acid, in a non-hydroxylic organic solvent such as benzene, toluene, dioxane, etc., at room or slightly elevated temperature, i.e., up to about 80° C. Still another method comprises the reaction of an alkali metal salt of the appropriate indole carboxylic acid with the desired dialkylamino alkyl halide in the presence of a hydroxylic organic solvent such as a lower alkanol at temperatures varying from room temperature to 100° C. Yet another process useful for the preparation of the claimed esters includes the treatment of the mercuric or the silver salt of the indole carboxylic acid with the appropriate dialkylamino alkyl halide in the presence of an inert organic solvent such as a lower alkanol.

The novel compounds of this invention are useful as local anaesthetics. The following procedure was employed to establish the utility of these compounds as topical anaesthetics:

The hair around a rabbit's eye was clipped. The winking reflex was tested by gently touching the center of the cornea with a bluntly-pointed glass rod. Four drops of test solution, containing a 1% concentration of the test compound in water, were instilled into the conjuntcival sac of the left eye by means of a pipette. The right eye was maintained as control. The solution was allowed to remain in contact with the surface of the eyeball for two minutes by gently pressing the lids together. The time of abolishment of the wink reflex was noted and the duration of anaesthesia was tested at two minute intervals. The results are shown in Table I.

TABLE I

| Compound | Trials | Minimum Duration (minutes) | Maximum Duration (minutes) | Average | Percent Effectiveness |
|---|---|---|---|---|---|
| A | 35 | 68 | 152 | 94.2 | 100 |
| B | 18 | 83 | 141 | 117.0 | 100 |
| C | 6 | 49 | 73 | 57.4 | 100 |
| D | 11 | 64 | 105 | 80.7 | 100 |
| E | 8 | 5 | 11 | 7.0 | 100 |
| F | 7 | 25 | 47 | 36.0 | 100 |

A. Indole-3-carboxylic acid-2-diethylaminoethyl ester hydrochloride.
B. Indole-3-carboxylic acid-3-diethylaminopropyl ester hydrochloride.
C. 6-nitroindole-3-carboxylic acid-2-diethylaminoethyl ester hydrochloride.
D. 6-nitroindole-3-carboxylic acid-3-diethylaminopropyl ester hydrochloride.
E. Indole-2-carboxylic acid-2-diethylaminoethyl ester hydrochloride.
F. Indole-2-carboxylic acid-3-diethylaminopropyl ester hydrochloride.

This is a continuation-in-part of copending application Serial No. 814,668, filed May 21, 1959, now abandoned.

The following examples are submitted as being illustrative of the invention. They are not intended to limit the scope thereof.

*Example I*

Into a dry flask equipped with a stirrer, dropping funnel and condenser are placed 12 parts by weight of magnesium turnings, 100 parts by volume of anhydrous ether and a small crystal of iodine as catalyst. Five parts by weight of ethyl iodide are added all at once and after a few moments the yellow color of the iodine disappears and the ether begins to boil. The reaction is controlled by periodic cooling with an ice bath. An additional 75 parts by weight of ethyl iodide are then added dropwise. Stirring is maintained after the addition of the ethyl iodide for about half an hour, or until the reaction mixture cools to room temperature.

An ice-salt-bath is applied and 29.5 parts by weight of indole in 40 parts by volume of anhydrous ether are added gradually with stirring. Thirty parts by weight of chloroethyl carbonate are then added dropwise to the cooled solution of indolyl magnesium iodide. The reaction mixture is kept cold and stirring is maintained for an hour after the addition of the chloroethyl carbonate. Ice water is added very slowly and the resulting mixture is acidified with acetic acid and the ether layer separated. The ether solution is washed with sodium bicarbonate and dried over sodium sulfate.

Removal of the ether under reduced pressure leaves a red oily residue of the ethyl ester. This is not purified, but is refluxed for two and one-half hours with 100 parts by volume of 5.0 N potassium hydroxide. The aqueous solution is separated from a gummy residue that forms, acidified with acetic acid whereby indole-3-carboxylic acid precipitates. The product is transferred to a beaker and washed with a little ether and petroleum ether to remove any unreacted indole. The acid is filtered and recrystallized from a 40% aqueous ethanol solution. M.P. 218° C.–220° C.

The indole-2-carboxylic acid is prepared from o-nitrophenylpyruvic acid as described by Dicarlo, J. Am. Chem. Soc., 66, 1420 (1944) upon boiling with ferrous sulfate in ammonium hydroxide as described by Kermack et al., J. Chem. Soc., 119, 1602 (1921). M.P. 197° C.–200° C.

*Example II*

Into a flask equipped with stirrer, dropping funnel and condenser are placed 5 parts by weight of indole-3-carboxylic acid and 80 parts by volume of isopropanol. The acid dissolves upon heating. The solution is allowed to reflux and 4.2 parts by weight of 2-diethylaminoethyl chloride are added dropwise. The mixture is refluxed for two and one-half hours and allowed to cool overnight. A white precipitate forms which is filtered off and washed by suspending in anhydrous ether. Recrystallization from isopropanol gives indole-3-carboxylic acid-2-diethylaminoethyl ester hydrochloride, which is readily soluble in water and which gives a positive chloride test. M.P. 174° C.–175° C.

*Analysis.*—Calculated for $C_{15}H_{21}N_2O_2Cl$: N, 9.44. Found: N, 9.27.

*Example III*

Into a flask equipped with stirrer, dropping funnel and condenser are placed 4.5 parts by weight of indole-3-carboxylic acid and 75 parts by volume of isopropanol. The acid dissolves upon heating. The solution is allowed to reflux and 4.2 parts by weight of 3-diethylamino-1-propyl chloride are added dropwise. The mixture is refluxed for two and one-half hours and allowed to cool overnight. No precipitate results. The solvent is removed under reduced pressure leaving a reddish oil. The oil is washed several times with anhydrous ether whereupon it becomes semi-solid and almost white. The compound is treated with isopropanol and a small amount of anhydrous ether and a white solid precipitates upon scratching, which is indole-3-carboxylic acid-3-diethylaminopropyl ester hydrochloride. The product is recrystallized from absolute alcohol and ether. M.P. 165° C.–167° C.

*Analysis.*—Calculated for $C_{16}H_{23}N_2O_2Cl$: N, 9.01. Found: N, 8.80.

*Example IV*

Into a flask equipped with stirrer, dropping funnel and condenser are placed 3 parts by weight of 6-nitroindole-3-carboxylic acid and 125 parts by volume of isopropanol. The acid dissolves upon heating. The solution is allowed to reflux and 2.0 parts by weight of 2-diethylaminoethyl choride are added dropwise. The mixture is refluxed for two and one-half hours and allowed to cool overnight. A small amount of a reddish oil separates leaving a clear yellow solution. The alcoholic solution is reduced in volume and anhydrous ether is added producing a light brown precipitate. This is redissolved in isopropanol, a little charcoal added and, after heating and filtering, the addition of anhydrous ether precipitates a yellow product of 6-nitroindole-3-carboxylic acid - 2 - diethylaminoethyl ester hydrochloride. M.P. 210° C.–212° C.

*Analysis.*—Calculated for $C_{15}H_{20}N_3O_4Cl$: N, 12.30. Found: N, 12.62.

*Example V*

Into a flask equipped with stirrer, dropping funnel and condenser are placed 3 parts by weight of 6-nitroindole-3-carboxylic acid and 125 parts by volume of isopropanol. The acid dissolves upon heating. The solution is allowed to reflux and 2.2 parts by weight of 3-diethylamino-1-propyl chloride are added dropwise. The mixture is refluxed for two and one-half hours and allowed to cool overnight. A small amount of reddish oil separates leaving a clear yellow solution. The isopropanol is removed under reduced pressure and an orange oil results. The oil is shaken with a cold 10% sodium hydroxide solution and the free base, 3-diethylaminopropyl 6-nitroindole-3-carboxylate, is extracted with ether. The ether solution is dried over anhydrous sodium sulfate. The addition of a solution of hydrogen chloride in isopropanol produces an oil which becomes semi-solid after being washed several times with anhydrous ether. This is treated with isopropanol and a little ether and solidifies upon scratching. The product, the hydrochloride of the 6-nitroindole-3-carboxylic acid-3-diethylaminopropyl ester, is recrystallized from alcohol and ether. M.P. 208° C.–210° C.

*Analysis.*—Calculated for $C_{15}H_{22}N_3O_4Cl$: N, 11.81. Found: N, 12.13.

*Example VI*

Into a flask equipped with stirrer, dropping funnel and condenser, are placed 2 parts by weight of indole-2-carboxylic acid and 35 parts by volume of isopropanol. The acid dissolves upon heating. The solution is allowed to reflux and 1.6 parts by weight of 2-diethylaminoethyl chloride are added dropwise. The mixture is refluxed for two and one-half hours and allowed to cool overnight. A small amount of solid precipitates which, after recrystallization from absolute alcohol and ether melts at 178° C.–180° C.

The alcoholic solution is evaporated under reduced pressure leaving a reddish oil. This is washed several times with anhydrous ether whereupon the oil becomes semi-solid and almost white. The product is dissolved in a minimum amount of hot isopropanol and then cooled with occasional scratching. A white solid of indole-2-carboxylic acid-2-diethylaminoethyl ester hydrochloride precipitates which is recrystallized from absolute alcohol and ether. M.P. 178° C.–180° C.

*Analysis.*—Calculated for $C_{15}H_{21}N_2O_2Cl$: N, 9.44. Found: N, 9.31.

*Example VII*

Into a flask equipped with stirrer, dropping funnel and condenser are placed 2 parts by weight of indole-2-carboxylic acid and 35 parts by volume of isopropanol. The acid dissolves upon heating. The solution is allowed to reflux and 1.8 parts by weight of 3-diethylamino-1-propyl chloride are added dropwise. The mixture is refluxed for two and one-half hours and allowed to cool overnight. No precipitate forms. The solvent is removed under reduced pressure leaving a reddish oil. This is washed several times with anhydrous ether whereupon the oil becomes semi-solid and almost white. The product is treated with isopropanol and a small amount of anhydrous ether and a white solid precipitates upon scratching. The compound, indole-2-carboxylic acid-3-diethylaminopropyl ester hydrochloride, recrystallizes from absolute alcohol and ether. M.P. 170° C.–171° C.

*Analysis.*—Calculated for $C_{16}H_{23}N_2O_2Cl$: N, 9.01. Found: N, 9.06.

What we claim is:

1. A compound selected from the group consisting of those having the formula:

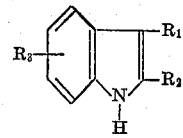

wherein at least one of the substituents $R_1$ and $R_2$ is the radical COOXN=B, the other being hydrogen, X is a lower alkylene group and N=B is N,N-di-lower alkylamino, $R_3$ is a member of the group consisting of hydrogen and nitro, and therapeutically active acid addition salts thereof.

2. Indole-3-carboxylic acid-2-diethylaminoethyl ester.
3. The hydrochloride of the compound of claim 2.
4. Indole-3-carboxylic acid-3-diethylaminopropyl ester.
5. The hydrochloride of the compound of claim 4.
6. 6-nitroindole-3-carboxylic acid-2-diethylamino-ethyl ester.
7. The hydrochloride of the compound of claim 6.
8. 6-nitroindole-3-carboxylic acid-3-diethylamino-propyl ester.
9. The hydrochloride of the compound of claim 8.
10. Indole-2-carboxylic acid-2-diethylamino-ethyl ester.
11. The hydrochloride of the compound of claim 10.
12. Indole - 2 - carboxylic acid - 3 - diethylaminopropyl ester.
13. The hydrochloride of the compound of claim 12.

References Cited in the file of this patent

Promotionsarbeit—Synthese einiger Indol-2- und Indol-3-carbonsaure—Derivate mit lokalan asthetischer und bakteriostatischer Wirkung. Prom Nr. 2788, December 13, 1958, pages 9, 53, 83–88.